United States Patent
Keicher et al.

(10) Patent No.: US 6,476,343 B2
(45) Date of Patent: *Nov. 5, 2002

(54) ENERGY-BEAM-DRIVEN RAPID FABRICATION SYSTEM

(75) Inventors: David M. Keicher, Albuquerque, NM (US); Clinton L. Atwood, Albuquerque, NM (US); Donald L. Greene, Corrales, NM (US); Michelle L. Griffith, Albuquerque, NM (US); Lane D. Harwell, Albuquerque, NM (US); Francisco P. Jeantette, Albuquerque, NM (US); Joseph A. Romero, Albuquerque, NM (US); Lee P. Schanwald, Albuquerque, NM (US); David T. Schmale, Albuquerque, NM (US)

(73) Assignee: Sandia Corporation, Albuquerque, NM (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,623

(22) Filed: Apr. 24, 1998

(65) Prior Publication Data

US 2001/0008230 A1 Jul. 19, 2001

Related U.S. Application Data

(63) Continuation-in-part of application No. 08/676,547, filed on Jul. 8, 1996, now Pat. No. 6,046,426.

(51) Int. Cl.$^7$ .............................. B23K 26/20
(52) U.S. Cl. .................. 219/121.63; 219/121.84
(58) Field of Search ............. 219/121.63, 121.64, 219/121.65, 121.84, 121.85; 427/596

(56) References Cited

U.S. PATENT DOCUMENTS

| | | | | | |
|---|---|---|---|---|---|
| 5,038,014 | A | * | 8/1991 | Pratt et al. | 219/121.64 |
| 5,134,569 | A | * | 7/1992 | Masters | 700/182 |
| 5,147,999 | A | * | 9/1992 | Dekumbis et al. | 219/121.63 |
| 5,208,431 | A | * | 5/1993 | Uchiyama et al. | 219/121.63 |
| 5,245,155 | A | * | 9/1993 | Pratt et al. | 219/121.63 |
| 5,321,228 | A | * | 6/1994 | Krause et al. | 219/121.84 |
| 5,453,329 | A | * | 9/1995 | Everett et al. | 219/121.66 |
| 5,837,960 | A | * | 11/1998 | Lewis et al. | 219/121.63 |

* cited by examiner

Primary Examiner—Geoffrey S. Evans
(74) Attorney, Agent, or Firm—Brian W. Dodson

(57) ABSTRACT

An energy beam driven rapid fabrication system, in which an energy beam strikes a growth surface to form a molten puddle thereon. Feed powder is then injected into the molten puddle from a converging flow of feed powder. A portion of the feed powder becomes incorporated into the molten puddle, forcing some of the puddle contents to freeze on the growth surface, thereby adding an additional layer of material. By scanning the energy beam and the converging flow of feed powder across the growth surface, complex three-dimensional shapes can be formed, ready or nearly ready for use. Nearly any class of material can be fabricated using this system.

10 Claims, 16 Drawing Sheets

Figure 4a                                Figure 4b

ENERGY-BEAM-DRIVEN RAPID FABRICATION SYSTEM

This application is a continuation-in-part of U.S. patent application Ser. No. 08/676,547, filed by Keicher et. al. on Jul. 8, 1996, now U.S. Pat. No. 6,046,426.

This invention was made with Government support under Contract No. DE-AC04-94DP85000 awarded by the United States Department of Energy. The Government has certain rights in the invention.

BACKGROUND OF THE INVENTION

This invention relates generally to the energy-beam-driven deposition of a material onto a growth surface, and more particularly to a system for the energy-beam-driven deposition of powdered material to rapidly fabricate objects.

Processing of materials into desired shapes and assemblies has traditionally been approached by the combined use of rough fabrication techniques (e.g., casting, rolling, forging, extrusion, and stamping) and finish fabrication techniques (e.g., machining, welding, soldering, polishing). To produce a complex assembly in final, usable form ("net shape"), a condition which requires not only the proper materials formed in the proper shapes, but also having the proper combination of metallurgical properties (e.g., various heat treatments, work hardening, complex microstructure), typically requires considerable investment in time, tools, and effort.

Because of the factors referred to above, there has been interest for some time in techniques which would allow part or all of the conventional materials fabrication procedures to be replaced by additive techniques. In contrast to most conventional materials fabrication techniques, which focus on the precision removal of material, additive techniques are based on the (usually computer-controlled) precision addition of material. Additive techniques also offer special advantages, such as seamless construction of complex configurations which, using conventional manufacturing techniques, would have to be assembled from a plurality of component parts. For the purposes of this specification and the appended claims, the term 'plurality' consistently is taken to mean 'two or more'.

Additive techniques are particularly appropriate for automation, for example the creation of objects based on a computer model and fabrication of small numbers of essentially identical copies. They offer the potential for providing new capabilities in rapid prototyping, rapid manufacture, and rapid fabrication of forms and dies used in mass production.

What portion of conventional manufacturing techniques can be replaced by additive techniques depends, among other factors, on the range of materials available to be deposited using additive techniques, the feature size and the surface finish achievable using additive techniques, and the rate at which material can be added. The ultimate goal is to develop additive techniques capable of fabricating complex precision net-shape components ready for use. In many cases, some degree of finishing will actually be required; such a product is termed near-net shape. Of course, crude billets and approximate forms (preforms) requiring considerable conventional materials fabrication processing for the ultimate application can also be made using additive techniques.

Various approaches exist to use localized energy provided by a laser to deposit a material onto a growth surface. A common example is laser spray techniques, in which a powder is sprayed through a laser beam. The exposure to the laser beam is sufficient to melt the powder, which then cools, solidifies, and adheres to a growth surface, which can be heated, but which remains solid in either case. A related technique is selective laser sintering, in which a thin layer of powder is laid on a growth surface. A laser then traces the solid cross-section of a desired part in the powder, thereby heating the powder and acting to sinter the powder to the growth surface. These techniques are suited to reproduce a shape, but are quite inflexible concerning the material properties of the final piece. In particular, making a component whose material is 100% dense (essentially void-free) is virtually impossible using these techniques.

The above techniques, at least in principle, can fabricate objects from a wide range of materials. Another class of laser-driven additive fabrication techniques, known as stereolithography, essentially function only for photopolymerizable polymers. These techniques typically focus an ultraviolet laser on a growth surface coated with a thin layer of a fluid monomer (or pre-polymer). Where the laser hits, a solid polymer is produced, and a three-dimensional object can be built up by addition of multiple layers. This class of techniques is limited to fabricating plastic objects. Although such objects can at times be used as molds to aid in the production of more general components, such use often fails to eliminate the bulk of the expensive conventional fabrication processing.

Non-laser based additive techniques for rapid fabrication exist. Examples include ink-jet printing techniques, in which the ink is replaced by a thermoplastic material which sets when it hits the growth surface, and closely related bonding techniques, which use a series of nozzles to draw a pattern of a binder on a thin powder layer atop a growth surface. Where the binder hits, a solid material is formed which adheres to the growth surface. As is usual in additive techniques, the thickness of the desired object is built up by "printing" multiple layers atop one another. These techniques are generally limited to fabrication of molds with a large organic component.

The limitations and difficulties in using these additive fabrication techniques exposes the need for a new class of additive fabrication techniques capable of fabricating net shape or near-net shape objects of a wide variety of materials such that the objects exhibit essentially theoretical material density (i.e., the material making up the objects is essentially free of voids).

An interesting approach to laser-driven additive fabrication technique appears in U.S. Pat. No. 4,323,756 (Brown et al.), which teaches building up a solid object by directing an energy beam (restricted to laser beams and electron beams) onto the surface of a substrate, thereby melting the surface of the substrate to a shallow depth.

A feed powder (or a feed wire) is introduced into the molten region from a single off-axis position. When the feed material melts in the molten region, the volume of the molten region increases. That volume, however, is roughly determined by the laser energy input, the melting point of the growth surface, and the thermal characteristics of the material making up the growth surface.

Accordingly, when feed material is added to the molten region, it forces some of the material making up the molten region to freeze onto the growth surface, forming thereon a layer of new material. As the laser is scanned across the growth surface, a solid layer is produced, and a specific object geometry can be built up by growing multiple layers in the manner described above. This technique is adaptable to the deposition of many organic materials and plastics, but also to metals, glasses, and certain other classes of inorganic materials. As the layers being grown solidify from a molten region, essentially void-free material nearly always results.

Brown et al. describe many of the features sought to fill the need for new and more capable additive fabrication techniques. However, their system has difficulties in operation which greatly limit its practical use. Perhaps foremost among these is the tendency of such techniques to exhibit low-frequency fluctuations in the layer growth rate. When such fluctuations occur, individual layers have significantly non-uniform thickness, leading to a rippled surface, poor dimensional tolerances, and inhomogeneous material properties. The layer thickness has also been found to depend on the direction of translation of the laser beam across the surface relative to the orientation of the off-axis powder feed source. This also leads to an unsatisfactory process for rapid and routine application to fabrication of complex components.

There is thus a need for an additive laser-driven material fabrication technique which will share the virtues of the teachings of U.S. Pat. No. 4,323,756, but which will avoid the shortcomings thereof, thereby allowing practical fabrication of complex objects.

SUMMARY OF THE INVENTION

The present invention provides a system for fabricating objects whereby an energy beam directed onto a growth surface creates a melt-pool thereon. A converging stream of powdered material is injected into the melt-pool, and melts or dissolves therein, thus adding to the volume of the melt-pool. The volume of the melt-pool being roughly fixed by thermal balance dynamics, this injection forces some of the contents of the melt-pool to freeze onto the growth surface, thereby forming a new layer. This process is carried out over appropriate regions of the growth surface to form thereon a cross-section of the desired object. Multiple layers can be formed in a sandwich structure to build up a complex three-dimensional structure.

BRIEF DESCRIPTION OF THE DRAWINGS

FIG. 2a shows a typical gas and powder flow resulting from the use of a pair of opposed nozzles. FIG. 2b shows the gas and powder flow as viewed from above. Similarly, FIGS. 2c and 2d show the equivalent gas and powder flows which result from use of a conical nozzle.

FIG. 4a is a bottom view, and FIG. 4b is a cross-sectional view.

FIG. 7 is a schematic illustration of an implementation for a recycling mixer.

DETAILED DESCRIPTION OF THE INVENTION

Figure 1:
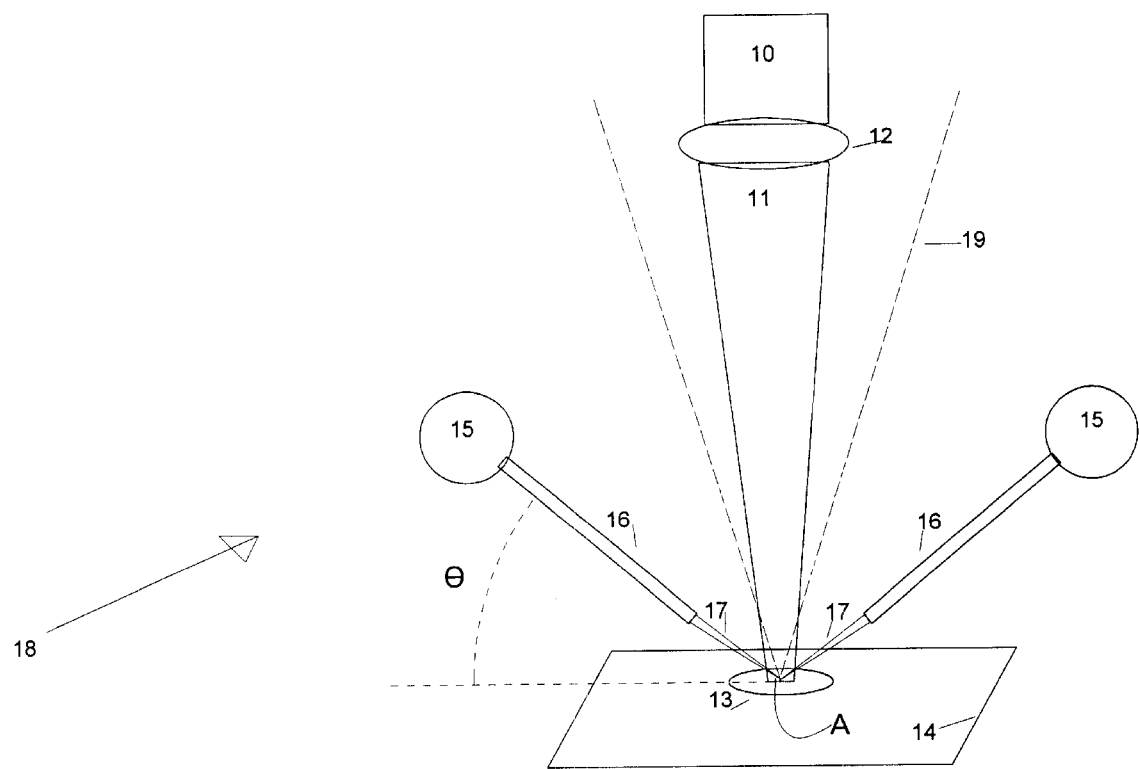
FIG. 1 is a schematic illustration of the energy beam driven rapid fabrication system.

The present invention is a energy beam driven rapid fabrication system of vastly improved utility and economy over existing techniques. The present system is illustrated in FIG. 1. Here an energy beam 10 is directed onto a growth surface 14. The act of direction can include use of concentrating optic 12 to generate a concentrated energy beam 11, and thereby increase the energy density on growth surface 14. Alternately, concentrating optic 12 need not be used (or equivalently, a concentrating optic 12 having essentially zero concentrating ability, such as air or a window can be substituted) if energy beam 10 is produced with sufficiently large energy density to allow the instant invention to function.

The present invention will function as described when energy beam 10 is a laser beam, an electron beam, an ion beam, a cluster beam, a neutral particle beam, a plasma jet, or a simple electrical discharge (arc). A neutral particle beam is typically an ion beam which, after formation, is merged with an electron beam of substantially equal but opposite current. When energy beam 10 is charged, as is generally true for an electron beam, an ion beam, and for a subclass of cluster beams, means (not illustrated herein) to control and/or compensate for charging of the apparatus and/or the growth surface must be brought into use. Such means are well-known in the appropriate arts, and are intended to be incorporated into the present invention.

When energy beam 11 hits growth surface 14, the function of the present invention requires that the energy density thereon be large enough to melt a small portion of the growth surface 14, thereby forming melt-pool 13. The energy density of the energy beam 10 at growth surface 14 should be such that melt-pool 13 is formed, but also should be small enough that substantial material is not lost to the growth surface 14 by evaporation, splattering, erosion, shock-wave interactions, or other dynamic effects. As the energy input to the region of the melt-pool 13 is time-averaged according to the thermal response of growth surface 14, suitable regimes exist for the use of pulsed energy beams. Given the thermophysical properties of growth surface 14, prediction of these regimes is a simple problem in thermal heat flow, using methods known to one skilled in the art.

Melt-pool 13 comprises liquefied material from growth surface 14, but can also comprise added feed material. Such additional feed material is supplied in the form of feed powder. Feed powder is directed onto melt-pool 13 in the form of a feed powder/propellant gas mixture 17 formed into a converging flow by nozzles 16. The feed powder/propellant gas mixture is supplied by reservoirs 15. The flow pattern of feed powder/propellant mixture 17 is defined by nozzles 16, and substantially converges into an apex, or region of smallest physical cross-section. This apex is often positioned proximate to melt-pool 13, to increase the proportion of the feed material which actually is incorporated into the liquid of melt-pool 13.

When the feed powder mixture 17 is injected into melt-pool 13 by nozzles 16, at least a portion of the feed powder becomes incorporated in the liquid of melt-pool 13. However, in direct contradistinction to Brown et al., which specifically requires that more than half of the material in the molten region is material from the substrate surface, the present invention is typically operated so that only a small proportion, typically 5–20%, of the liquid in melt-pool 13 is melted growth surface 14.

Incorporation of feed powder into melt-pool 13 can result from numerous physical processes, including melting of feed powder within the melt-pool 13, dissolution of feed powder within melt-pool 13 (which can occur at temperatures below the melting point of the feed powder), injection of melted feed powder (melted by interaction of the feed powder with the energy beam prior to injection, or otherwise) into the melt-pool 13, thereby forming a solution, and decomposing the feed powder in the melt-pool 13 to form a decomposition product which will melt or dissolve in the liquid of the melt-pool 13. Numerous other processes for incorporation will occur to one skilled in the art. All such processes form a proper basis for operation of the present invention.

The feed powder can have a different chemical composition than does the growth surface 14, whereupon the liquid of the melt-pool 13 will comprise a blend of the two chemical compositions. Note also that the feed powder can comprise a component which will not become incorporated into the liquid of the melt-pool 13, but rather will remain therein in solid form, for example, tungsten carbide in a melt-pool 13 composed primarily of aluminum. Such multicomponent feed powders also allow combinations of materials to be used which are difficult to form using conventional techniques. The above example of tungsten carbide distributed roughly uniformly in an aluminum matrix is a composite material which would be extremely difficult to make by, e.g., casting, and to form with conventional techniques. Formation of a complex object made of this unusual composite, however, is a routine application of the instant invention.

The melt-pool 13 is originally formed by the action of energy beam 11 on growth surface 14. The material of growth surface 14 melts locally, and that melting proceeds until the thermal energy escaping the solid-liquid interface between the melt-pool 13 and the growth surface 14 approximately equals the energy absorbed from the energy beam. When feed powder 17 is injected into and becomes incorporated into melt-pool 13, the area of the solid-liquid interface increases. As the energy input is still the same, this means that a portion of the liquid of melt-pool 13 must solidify to reduce the area of the solid-liquid interface, thereby restoring the balance to thermal energy flow.

When this occurs, a new material layer is formed on top of the original growth surface 14, that layer containing primarily material from the feed powder (or components thereof), and having material from growth surface 14 as a (usually) smaller constituent. It is often observed that the new material layer and the growth surface 14 are in epitaxial relation to each other, an observation confirming that growth occurs outward from the growth surface/melt-pool interface, rather than uniformly within the melt-pool volume.

The system components 10–12 and 15–17 will hereafter be referred to as delivery system 18. As delivery system 18 is moved relative to growth surface 14, a weld-bead is produced where conditions allowed formation of a melt-pool together with converging flow of feed powder. Patterns of this weld-bead deposited on the growth surface 14 make up a new material layer. Multiple such layers are then formed atop one another to fabricate solid three-dimensional objects, using design and control techniques analogous to those used in stereolithography and related fields.

A broad range of materials are compatible with fabrication processes based on use of the instant invention. The growth surface 14 should interact with energy beam 11 so as to melt a localized region growth surface 14, thereby forming melt-pool 13. At least some portion of feed powder 17 must melt, dissolve, or otherwise become incorporated in the liquid of the melt-pool 13 in order to grow new material layers. The interaction of energy beam 11 with growth surface 14 should not be so large that material contained within the melt-pool 13 is removed faster (e.g., by evaporation, erosion, splattering, or similar mechanisms) than it is being added by incorporation of feed powder. Essentially any combination of feed powder and growth surface which simultaneously satisfy the above conditions in some regime of process conditions can be produced using the instant invention.

Most experimental work to date in this field has concentrated on growth of components comprising metal alloys. However, the instant invention enables use of feed powders (or later, the individual source powders) comprising any elemental solid, any metal alloy, ceramics, fusible inorganic compounds, semiconductors, glasses, fusible organic compounds, thermoplastics, and mixtures of the above.

The choice of growth surfaces is more constrained than is the choice of feed powder. Recall the requirement that the energy beam produce a local melt-pool on the growth surface. This precludes, for example, using a growth surface made of graphite, because graphite does not melt, but rather sublimates, at ordinary pressures. However, graphite can be used as a feed powder which becomes incorporated into a melt-pool 13 on an iron growth surface 14. The graphite will dissolve in the liquid iron, thereby forming a thin layer of steel at the iron surface.

Arbitrary combinations of feed powder and growth surface are not compatible with the instant invention. The growth surface 14 and the feed powder must be chosen so that at least a portion of the feed powder can incorporate into the melt-pool 13, by melting and alloying with or dissolving in the liquid of the melt-pool 13. Within the above constraints, however, objects comprising a wide range of materials and alloys can be fabricated using the instant invention.

As new material layers are deposited by freezing from the melt-pool, an object fabricated using the instant invention usually exhibits substantially theoretical density, that is, the object does not have unwanted porosity. There are special situations, such as when gas is generated in the melt-pool during growth, when density significantly less than the theoretical can be produced if desired.

Depending on the materials used and the object tolerances required, it is often possible to form net shape objects, or objects which do not require further machining for their intended application (polishing and the like are permitted). A first implementation of the instant invention has a demonstrated capability of forming feature sizes below 10 mils while maintaining dimensional tolerances and surface finish on the order of 1 mil on a three-dimensional object, which is sufficient for many applications.

When more precise tolerances are required than are allowed by a specific implementation of the instant invention, precision machining can be used in a "finishing" mode to prepare an object fabricated using the instant invention for actual use. Such an object, following fabrication using the instant invention, is called near-net shape, a term intended to convey that little material or machining effort is required to complete the fabrication process.

Other possibilities for application of the instant invention exist. For example, if the material being grown is a metastable alloy whose formation depends on the rapid cooling which can result from proper use of the instant invention, then the fabrication of thin blades of the material might not be practical, as there is insufficient surrounding material on the blade cross-section to allow the deposited material to cool rapidly enough to preserve the metastable alloy. In such a case, one can use the present invention to fabricate a manufacturing preform, in which the material that will form the blades is thick enough to survive fabrication via the instant invention, and will thereafter be machined to shape using other techniques. Such combination of the instant invention and conventional machining and forming technologies will often prove to be useful.

Another alternative in the above scenario is to produce a solid billet of material which cannot otherwise be readily fabricated as raw material for other fabrication methods. These might include machining, but stamping, rolling, pressing, drawing, and many others can also use such unique billets.

The same potential for rapid cooling associated with deposition of new material using the instant invention offers the possibility of making materials which are not at thermodynamic equilibrium. The rate of cooling is roughly determined by the speed of the melt-pool on the growth surface (controlled by the rate of relative motion of the delivery system 18 and the growth surface 14) and the thermal conductivity of the growth surface 14. Rates as large as $10^{6\circ}$ K/second can be easily achieved in metals. Two clear examples of such structures involve formation of earl new material which is metastable in atomic structure, and formation of new material having a nonequilibrium microstructure. Both can be illustrated using a single material system.

At thermodynamic equilibrium, solid germanium and solid gold are almost entirely immiscible—solid solutions of the pair do not form. In the liquid form, however, they are completely miscible. The instant invention can be used to inject gold feed powder into a melt-pool on a germanium growth surface. When the energy beam moves over the growth surface, causing the melt-pool to move with it, the liquid gold-germanium alloy left behind will solidify. In the solid state, the thermodynamically favored distribution of the two materials is large gold crystallites in a germanium matrix.

However, at the moment of solidification (particularly if the eutectic composition is chosen), the gold atoms are distributed uniformly in the germanium. It takes time for the gold atoms to diffuse through the germanium, find each other, and thereby form discrete crystallites. The time required for such crystallite growth depends on the temperature, proceeding faster at larger temperatures.

Accordingly, if the new germanium-gold layer experiences sufficiently rapid cooling, the original uniformly dispersion of gold atoms in a germanium matrix will be preserved. This is the structure of a solid solution, which is forbidden by equilibrium thermodynamics in this material system, but which can be preserved in a metastable material.

If the germanium-gold material cools more slowly, the final configuration will be gold crystallites in a germanium matrix, but those crystallites will be much smaller and much more closely spaced than expected. This is an example of quenching a nonequilibrium microstructure.

Note that the above structure is also an example of a composite microstructure. The instant invention can be used to make materials with composite microstructures by methods including post-growth segregation (as above), and by forming a melt-pool liquid containing solid particles. On the macro scale, objects can include several chemical components by using the instant invention's ability to rapidly grade or abruptly change the material being deposited.

The rate of growth of new material is directly related to the rate at which feed powder is injected into the melt-pool. Considerable simplification of such a system results if the feed powder is injected at a substantially constant rate, thereby avoiding measuring said rate and controlling the growth process by dynamically varying the other process variables.

Injection of feed powder into the melt-pool 13 at a constant rate is most likely to happen when the converging flow of feed powder 17 has certain characteristics, to be described later, and when both the flow rate of feed powder and the flow rate of propellant gas is substantially constant. These are not required conditions for using the present invention, but are often favored conditions for operation.

To fabricate objects, the present invention also requires a rastering system, which moves the delivery system 18 and the melt-pool 13 relative to growth surface 14 while controlling the rate of flow of feed powder so that at least one material layer is added to growth surface 14. The rastering system is not shown here for simplicity. Such rastering systems are well-known in the art (e.g., conventional machine tools), and must be operated within speed regimes consistent with the operating principles for the present invention outlined above.

In one implementation, the converging flow of feed powder 17, except for a small region near the apex A of the converging flow 17, is substantially restricted to a region external to a conical volume defined by dashed lines 19 centered around the energy beam, the vertex of the conical volume substantially coinciding with the melt-pool 13. This is the configuration illustrated in FIG. 1. This configuration reduces unwanted interaction of the feed powder 17 with energy beam 11 prior to their mutual action on melt-pool 13. For example, the feed powder 17 can scatter energy beam 11, thereby reducing the energy density of the energy beam at growth surface 14. Alternately, energy beam 11 can melt the feed powder 17 prior to hitting growth surface 14. This can result in improper growth in some material systems, and often results in welding scattered pieces of feed powder 17 to regions of the growth surface 14 outside the melt-pool 13, thereby reducing the surface finish and ultimate dimensional tolerances of the object being fabricated.

In another implementation of the present invention, the converging flow of feed powder 17 acts to inject the feed powder into melt-pool 13 on trajectories substantially normal to the surface of the melt-pool 13, rather than on the trajectories initially defined by the orientation of nozzles 16, or on trajectories defined by uncontrolled flow mixing. This is illustrated schematically in FIGS. 2a–d.

Figure 2A:
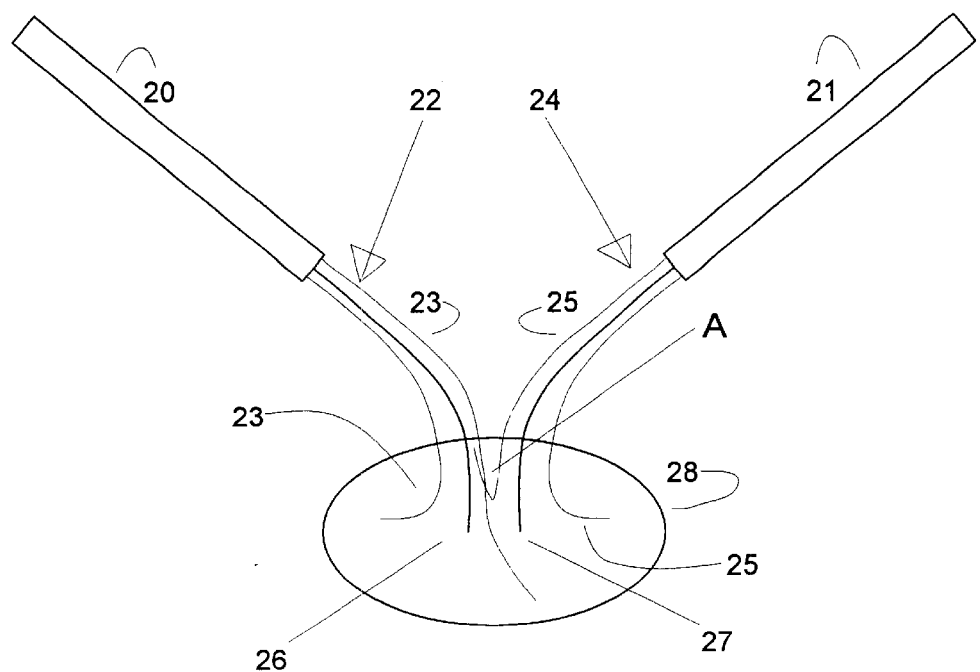
FIGS. 2a–d are schematic illustrations describing how a converging flow of feed powder/gas mixture can result in the feed powder being injected into the melt-pool nearly normal to the surface of the melt-pool.
Figure 2B:
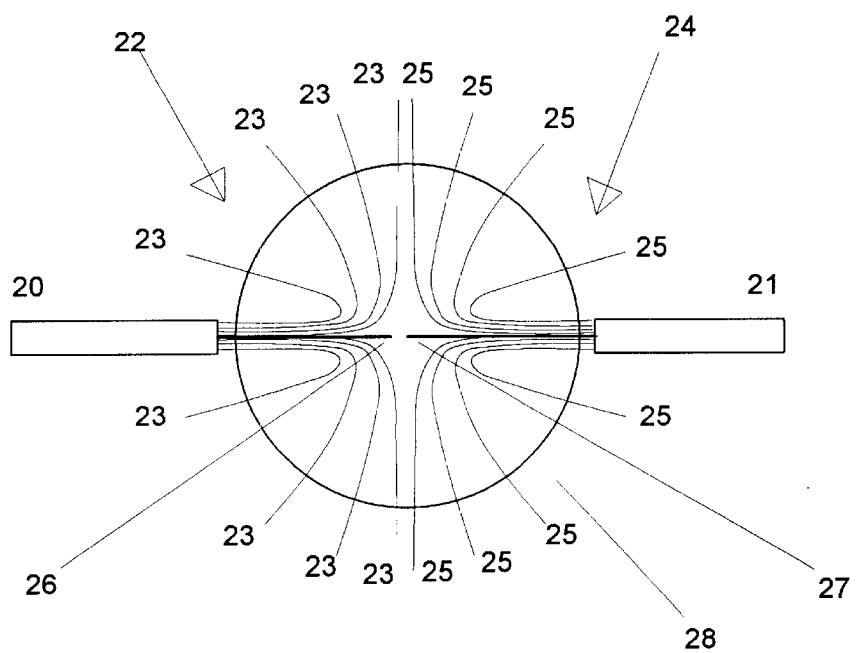
Figure 2C:
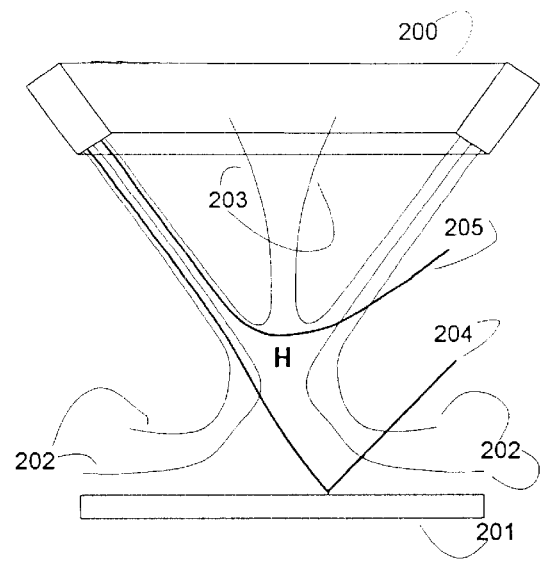

In FIGS. 2a and 2b, nozzles 20 and 21 project streams 22 and 24 of a feed powder/propellant gas mixture toward each other to produce a converging flow having an apex A near the target 28 (i.e., the melt-pool as previously described). The streamlines 23 of feed powder/propellant gas stream 22, and the streamlines 25 of feed powder/propellant gas stream 24, show the path that a propellant gas molecule will trace out as it emerges from nozzles 20 and 21, converges on target 28, and then leaves the immediate region of the flow apex A. Trajectories 26 and 27 are the trajectories followed by particles of feed powder propelled, respectively, by feed powder/propellant gas streams 22 and 24 from nozzles 20 and 21. Unless the inertia of the particles of feed powder prevents, such particles will approximately follow the gas flow streamlines.

The propellant gas streams 22 and 24 initially travel from nozzles 20 and 21 inward along substantially straight paths. However, when gas streams 22 and 24 begin to occupy the region near their mutual point of convergence (roughly the central axis of target 28), they interact. This interaction causes the opposing momentum of feed powder/propellant gas streams 22 and 24 parallel to the surface of target 28 to approximately cancel, which forces feed powder/propellant gas streams 22 and 24 to move toward target 28 along an orientation nearly normal to the surface of the target 28. This redirection of feed powder/propellant gas streams 22 and 24 is slow enough that the feed powder trajectories 26 and 27 follow streamlines 23 and 25 rather closely. As a result, the feed powder trajectories 26 and 27 become nearly normal to the target surface as they approach target 28.

The next influence on the propellant gas streams 22 and 24 is interaction with the target 28. As gas does not penetrate the target surface, it must flow along, and to some extent away from, the surface. This interaction drives the rapid curvature seen in streamlines 23 and 25 near target 28. FIG. 2b, which shows a projection of the streamlines normal to the target surface, is particularly instructive in this regard, as the flow pattern defined by the streamlines 23 and 25 is that corresponding to a classic Morse singularity.

An important feature of such a flow pattern is that the gas flow near the central region of the target 28 exhibits large shear rates, i.e., the orientation and magnitude of the gas flow varies rapidly with position. When this occurs, the inertia of the feed powder particles prevents them from following the propellant gas streamlines 23 and 25. The feed powder particles rather continue substantially along their original trajectories, and hit the surface of target 28 along trajectories 26 and 27 which are approximately normal to the target surface. The result is a uniform melt-pool environment independent of the direction of motion of the melt-pool along the growth surface, as well as efficient injection of the feed powder into the melt-pool.

Such flow patterns can be established using any number of multiple nozzles, as long as those nozzles are located roughly symmetrically about a circular locus, that locus is approximately centered on the target region 28, and the flow pattern and rate of the feed powder/propellant gas mixture from each nozzle is substantially identical. Note, however, that such idealized configurations are not required to obtain a convergent flow pattern which delivers feed powder to a small target region on trajectories nearly normal to the target surface. The symmetrically distributed nearly identical nozzles, however, are perhaps the simplest means to attain this goal.

It is particularly important to realize that these desirable flow patterns are not a general feature of converging flow nozzles. Consider for a moment the conical nozzle of FIGS. 2c and 2d, whereby a converging flow of powder is produced from a single nozzle having an annular flow passageway. Here conical nozzle 200 forms a cone of converging propellant gas flow, whose streamlines are indicated by paths 202 and 203, directed toward the surface of target 201. Trajectories 204 and 205 indicate typical paths on which the propellant gas flow will carry feed powder particles.

Several features of this conical nozzle flow differ qualitatively from that earlier described in FIGS. 1, 2a, and 2b as resulting from use of multiple symmetrical nozzles. A very high pressure region typically surrounded by turbulent flow is generated near the apex of the propellant gas flow even in the absence of the nearby target surface. This region is small in size, and is associated with relatively small radial gas velocities, i.e., is nearly stagnant. This stagnant region of high pressure H, which is not generated when multiple nozzles as described earlier are used, dominates the propellant gas flow dynamics, and with it the performance of such a nozzle.

The effect of the stagnant high-pressure region H appears in examining the gas flow streamlines. Streamlines 202 are slightly external to the converging cone of gas flow, and are repelled abruptly from the stagnant central region. The repulsion is rapid enough that the trajectory 204 of a feed powder particle being carried along with the gas flow is not significantly altered. As a result, trajectory 204 intersects the surface of target 201 at an acute angle. A large fraction of such feed powder particles will bounce off the target surface, rather than becoming incorporated in the melt-pool.

A second class of streamlines 203 begin slightly internal to the converging cone of gas flow. When these streamlines approach the stagnant high-pressure central region H, they will be repelled therefrom and redirected to travel away from the target surface. Related to this effect is a new class of trajectories 205, where the feed powder particles skip off the stagnant high-pressure region H, rather like a stone skipping from the surface of a lake.

The above discussion makes clear that simply adopting a converging flow of a gas/powder mixture will not automatically lead to an optimal energy beam driven rapid fabrication system. The limitations of the conical nozzle 200 include lack of a mechanism to generate the desirable trajectories 26 and 27, combined with generation of two new and undesirable classes of feed powder trajectories 204 and 205. The limitations of the conical nozzle produce inefficiencies in operation along with reduced ultimate surface finish and dimensional tolerances.

Figure 2D:
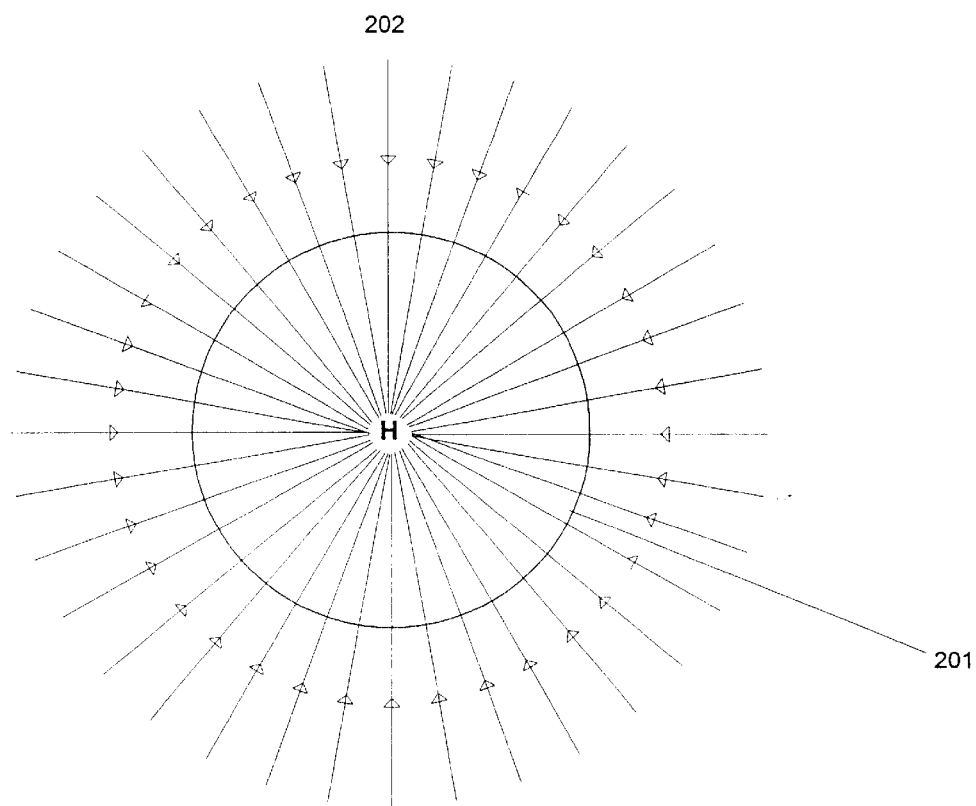

Why does one converging flow function differently in the present invention than does another? This can be understood by comparing the radial flow patterns of FIG. 2b (multiple nozzles) with those of FIG. 2d (single conical nozzle). In FIG. 2b, inward flow is driven by nozzles 20 and 21. However, when the gas from the nozzles approaches the central region of the target, it is free to move away from the central region by moving sideways into neighboring regions where gas is not being supplied. This allows gradual modification of the streamline directions, so that the feed powder particles can follow the streamlines until the flow intersects the target surface, at which point the feed powder particles uncouple from the propellant gas flow, and continue on to intersect the target surface.

In contrast, FIG. 2d shows a situation where inward flow toward the central region is being driven by the conical nozzle along all radial directions. As a result, when the gas flow approaches the central region H of the target, the propellant gas can only move up or down—it cannot relieve the rapidly increasing gas density by moving sideways. As a result, the gas streamlines 202 and 203 change more abruptly near the high-pressure central region H, and that region has a much higher pressure than the equivalent region when multiple nozzles are used. Further, the central region H is generally turbulent in the case of a conical nozzle, compared to being essentially stagnant when multiple angled nozzles are used. Feed powder particles from a conical nozzle are therefore not steered to trajectories nearly normal to the target surface, and generally bounce, scatter, and defocus, leading to inferior performance.

Note that symmetrically positioned nozzles are not required to obtain well-behaved converging flow patterns. Some degree of asymmetry can be compensated by regulating the amount of propellant gas/feed powder mixture passing through each nozzle. A useful rule of thumb for non-symmetric multiple nozzles is that if the nozzles all point to the same region, and if the momentum of the gas streams parallel to the target surface is near zero, the resulting flow pattern is likely to enable a high-performance implementation of the present invention.

The qualitative difference between the two converging flow patterns, and their dramatic effect on performance in the present invention, can be explained in terms of catastrophe theory. Catastrophe theory explains how dramatically different physical behaviors in related systems can often be traced back to topologically distinct initial conditions. In many cases involving gaseous flow, the relevant initial condition is the pattern of singularities in the flow streamline pattern. This pattern is generated by a vector field. Singularities in a vector field can be characterized by their Morse index. The Morse index of the multiple nozzle flow pattern of FIG. 2b differs from the Morse index of the single conical nozzle flow pattern of FIG. 2d. This fundamental qualitative difference drives the dramatic difference in performance.

Figure 3:
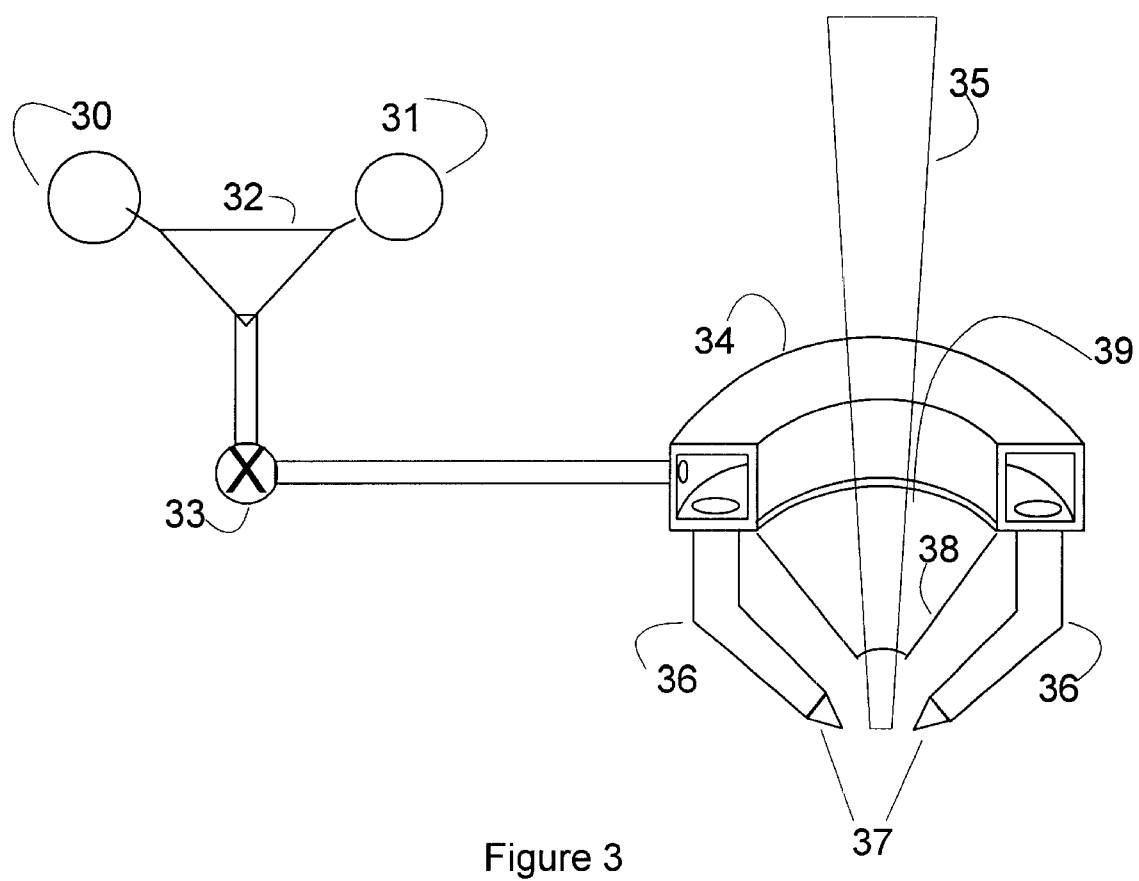
FIG. 3 is a schematic illustration of the feeder means, the powder delivery manifold, and the nozzles of the present invention.

FIG. 3 schematically illustrates one embodiment of a multiple nozzle delivery system, including a propellant gas source 30, a feed powder source 31, and a gas/powder feeder 32, which combines the propellant gas from 30 and the feed powder from 31, producing therefrom a gas/feed powder mixture. This mixture is delivered to cutoff valve 33, which acts to rapidly cut the supply of the gas/feed powder mixture to the nozzles 37. Cutoff valve 33 can be a simple pinch valve, or need not be present, depending on the requirements of the specific implementation of the present invention.

The gas/feed powder mixture is delivered to a powder delivery manifold 34, which distributes the gas/feed powder mixture substantially uniformly to a series of transfer tubes 36. For ease of explanation, manifold 34 is shown in cross section. The nozzles 37 are functionally attached to transfer tubes 36 away from manifold 34, and are so oriented as to produce a converging flow comprising the gas/feed powder mixture. The overall assembly is designed so as to emphasize the beneficial flow pattern characteristics described earlier. Energy beam 35 passes through aperture 39 of manifold 34, substantially along the central axis of the aperture. This is a single implementation of the present invention, and many of the specific features described or illustrated can be changed without unduly compromising system performance.

The propellant gas is chosen to be appropriate for the intended operation. The propellant gas can interact with the growth process, e.g., through chemical interaction with the melt-pool, the feed powder, or the growth surface. It can also provide a local shield around the region heated by the energy beam against ambient conditions.

When chemical interaction of the melt-pool, the growth surface, and the feed powder with the propellant gas is to be avoided, a simple inert gas (e.g., Ar or He) is usually chosen for the propellant gas. At other times, however, processes can require (or can be improved by using) nitrogen-containing gases, carbon-containing gases, inert gases, oxidizing gases, reducing gases, combinations of such gases, and even gases which will break down in the energy beam to provide a needed component for the growth process. Guidance for the choice of propellant gas can often be found in references on welding processes related to the intended energy beam rapid fabrication operation.

Note that transfer tubes 36 and the extended energy beam shield 38 are not required for operation of the present invention. Their inclusion is intended to reduce a problem encountered in lengthy ongoing operation of the present invention, and to reduce the work stoppage and maintenance costs associated with said problem.

A certain amount of the feed powder disbursed through nozzles 37 scatters from the surface of the melt-pool (not shown). Another fraction scatters from neighboring regions. In both cases the feed powder has been significantly heated, if not melted outright, by this exposure to regions heated by the energy beam and by direct exposure to the energy beam itself. As a result, when the heated but unincorporated feed powder finally strikes a surface without bouncing therefrom, it is likely to adhere strongly to that surface. This is an effect similar to sintering. This leads, over time, to a substantial build-up of feed powder on surfaces near the growth surface.

Build-up of feed powder on surfaces has been observed in the existing system. However, the build-up of feed powder has been little more than a nuisance for exploratory development. Only now that long operating sessions became practical and desirable is build-up recognized as a serious impediment to routine operations of the present invention.

This build-up can affect surface finish, and hence means to limit it (such as proper converging flow design) are important to the optimal function of the present invention. Moreover, the build-up interferes with the operation of the present invention in at least two additional ways, either of which can render the present system impaired or nonfunctional until a lengthy and costly maintenance procedure is carried out.

One of these is when surfaces surrounding nozzles 37 become coated with built-up feed powder to the extent that the coating alters the gas/feed powder flow pattern produced by nozzles 37. Note that the immediate surroundings of nozzles 37 tend to be kept clean by the force of the gas/powder mixture flow. Interference with proper operation of nozzles 37 is more usually associated with thick overhanging deposits of feed powder build-up from nearby, but not immediately surrounding, surfaces.

The other is when the aperture 39 in manifold 34 through which energy beam 35 passes becomes partially blocked by built-up feed powder. This will usually happen at a position where the energy density of energy beam 35 is insufficient to directly remove the built-up feed powder, so the effect is to block and scatter energy beam 35, leading to poor function or non-function.

Both of these build-up related problems can be relieved by halting operation, allowing the workpiece to cool, opening the system to normal atmosphere, replacing or cleaning the parts clogged by build-up, reassembling the system, recalibrating flow rates, nozzle throughputs, the effective center of the workpiece relative to the powder delivery manifold position, and many other adjustments and measurements required before routine operation can be resumed. This is a lengthy set of tasks, to be avoided or postponed if possible in a manufacturing environment.

In both cases, the build-up of feed powder does not occur on the operating element (aperture or nozzle opening) directly, but rather on nearby surfaces. Proper design of those nearby surfaces can then reduce or eliminate this build-up. The simplest approach to such reduction is to remove surrounding surfaces to a distance. This is the purpose of transfer tubes 36 in FIG. 3. By placing nozzles 37 at the ends of transfer tubes 36, rather than mounting them directly on manifold 34, and configuring the nozzles so that there is little surface available for accumulation of feed powder build-up surrounding the nozzle opening (the point of the nozzle on the figure), a configuration is achieved wherein much longer operating times are achieved without interference by build-up.

Another approach to relieve the problems of powder build-up on surfaces is to provide sacrificial surfaces whose purpose is simply to shield the critical surface from exposure to hot feed powder. This is the function of extended energy beam shield 38, which is introduced to prevent build-up of feed powder on the surfaces of aperture 39 in manifold 34 through which the energy beam 35 passes. Shield 38 serves several purposes. It blocks direct build-up of hot feed powder on the manifold aperture 39. Further, the outer surface of shield 38, on which build-up is expected, is set at an angle such that massive amounts of build-up must occur before interference with the beam path occurs. Finally, should such interference eventually occur, proper system design can allow replacement (or removal and cleaning) of shield 38 without disturbing the micron-level calibrations of the overall fabrication system. Introduction of shield 38 thus leads not only to longer continuous operation periods, but also to simpler and faster maintenance procedures.

Another factor in the problem of feed powder build-up involves the placement and orientation of nozzles 37. FIG. 3 shows a delivery system which includes a pair of nozzles pointed at each other. One effect of this is that, when hot feed powder bounces from the surface of the melt-pool, it is likely to be directed more or less toward the opposing nozzle and its surroundings. Note that although the multiple nozzle design directs some of the feed powder along trajectories nearly normal to the surface of the melt-pool, it cannot direct all of the feed powder in that manner. The result is preferential build-up of feed powder near what is arguably the most sensitive system component.

A production energy beam driven rapid fabrication system according to the present invention can comprise equipment associated with measurement, calibration, and other functions, which is sensitive to feed powder build-up. Part of the solution for protection of such equipment can include positioning such equipment so that it does not directly oppose a nozzle.

Figure 4:
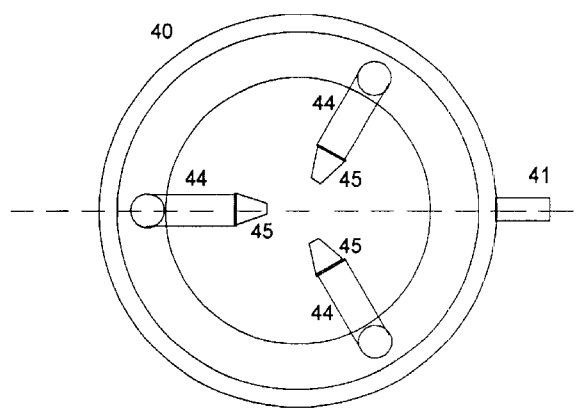
FIG. 4 is a schematic illustration of the powder delivery manifold and attached nozzles.
Figure 4:
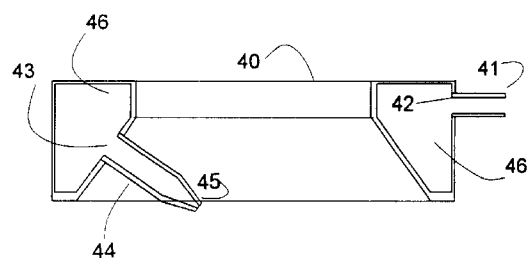

Removing surfaces near the nozzle apertures of course reduces the magnitude of this effect, but the residual problem still presents a practical limit to fabrication operations. One approach to reducing the problem of directly opposed nozzles is to choose delivery means which do not include directly opposed nozzles. The most direct way to avoid having directly opposed nozzles is to use an odd number (three or larger) of nozzles. In FIGS. 4a and 4b the gas/feed powder mixture is introduced into annular channel 46 of powder delivery manifold 40 through tube 41 mounted in port 42. The mixture travels throughout annular channel 46, exits annular channel 46 through ports 43 to transfer tubes 44, and thereby is fed to nozzles 45. By taking an odd number of nozzles symmetrically distributed about the energy beam (which passes through the central aperture in manifold 40), no nozzle directly opposes another, and a major source of build-up specific to the nozzles is avoided.

The specific implementation depicted in FIGS. 4a and 4b is a symmetric delivery system design, and uses those symmetries to avoid the opposing nozzle problem by adding the additional constraint that the number of nozzles be odd. This is not a general requirement, but is an approach for this specific implementation. Preferably geometries where build-up resulting from the output of one nozzle preferentially appears on surfaces near sensitive components(including, but not limited to, other nozzles) should be avoided.

Many implementations of the present invention will include an operating chamber, typically enclosing at least a delivery system, the growth surface or the workpiece, and the rasterizing system. Such design allows containment of unincorporated feed powder, envelopment of the workpiece in special atmospheres, reuse of expensive process gases and feed powders, and containment of chemical effluents generated by the fabrication process.

Figure 5:
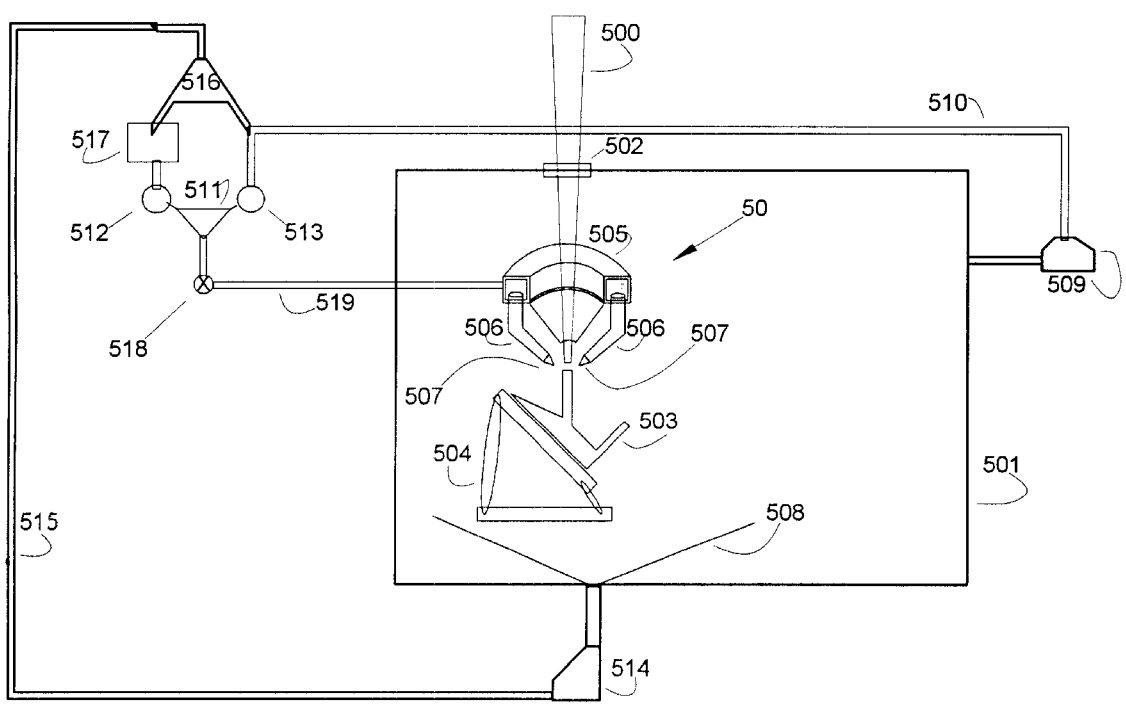
FIG. 5 is a schematic illustration of the energy beam driven rapid fabrication system featuring containment of the working surface and other required components disposed inside an operating chamber, including a recirculation system to reuse the process gases and a powder recycling system to collect and reuse the feed powder.

FIG. 5 shows schematically a more detailed implementation of the present invention comprising an operating chamber. Operating chamber 501 forms an essentially closed chamber which contains a delivery system 50 comprising powder delivery manifold 505, transfer tubes 506, and nozzles 507. Workpiece 503 is positioned below the delivery system 50, mounted on translation system 504. Translation system 504 is a part of the rasterizing system, which produces whatever motions are needed to fabricate workpiece 503.

Energy beam 500 enters operating chamber 501 through access 502, although the source for energy beam 500 (not illustrated) can be located either inside or outside the operating chamber 501 as is convenient. Locating the energy beam source inside operating chamber 501 is particularly useful if the energy beam is a plasma beam or an electrical discharge. If energy beam 500 is a laser beam, access 502 can comprise an optical window. Other options can require access 502 to comprise a thin membrane (electron or ion beam) or a vacuum seal to another chamber within which the source of the energy beam functions (any of the particle beam options).

Operating chamber 501 is usually filled with a processing atmosphere (not shown). This atmosphere can be ordinary air, or any of the gases mentioned earlier as potential propellant gases or mixtures thereof. It is often convenient to choose identical propellant gas and processing atmosphere, as then recycling does not involve separation of the gases. Separation is also not required if all gases released inside the operating chamber, called process gases, are compatible. For the present purposes, process gases are considered compatible if the results of a fabrication process are unchanged if arbitrary mixtures of the process gases in question are used for any of the process functions for which compatibility is at issue. Note that process gases compatible with one process, or one fabrication system, need not be compatible in other situations.

The process gases used by an energy beam driven rapid fabrication system often represent, if used only once, a significant part of the total operating expense. This suggests that recovery and recycling systems are a beneficial feature of such a system. An operating fabrication system has a continuous flow of propellant gas, and (if used) of recycling gas and sweep gas. If the process gases are not compatible, they can be collected for separation and reuse. If they are compatible, however, separation is not required for reuse, and a fabrication system with a substantially closed process cycle can be implemented.

In addition to the elements described earlier, recirculation pump 509 is operably connected to remove gas from the operating chamber 501, and to deliver it to propellant gas reservoir 513 via first conduit 510. Hopper 508 collects the feed powder introduced into the operating chamber through nozzles 507 but not incorporated into workpiece 503. Hopper 508 is functionally connected to recycling mixer 514, which combines the feed powder from hopper 508 with a recycling gas (source not illustrated, but can comprise the processing atmosphere or gas from the propellant gas reservoir 512) to form a recycling gas/powder mixture. This mixture is delivered to separator 516 via second conduit 515. Separator 516 acts to separate the recycling gas/powder mixture into pure recycling gas and into collected feed powder. Such separators are well known in the art. The pure recycling gas is then delivered to propellant gas reservoir 513. If the same feed powder is used throughout the grow process, the collected feed powder is delivered to feed powder reservoir 512 after particles of feed powder which are too large are removed by passing through sieve 517. If different feed powders are being used, or the collected feed powder is otherwise unsuitable for immediate reuse, the collected feed powder can be stored for later purification and reuse.

Gas/powder feeder 511 converts a flow of gas from propellant gas reservoir 513 and a flow of feed powder from feed powder reservoir 512 into a flow of gas/feed powder mixture. After passing through cutoff valve 518 (which can be a simple pinch valve), which can be used to abruptly halt the mixture flow, the mixture flow is delivered to the powder delivery manifold 505 via conduit 519.

The net effect of the above-described embodiment is to collect and reuse all gases and waste feed powder. 100% recycling efficiency is not to be expected, but considerable reduction of operating costs does result.

Figure 6:
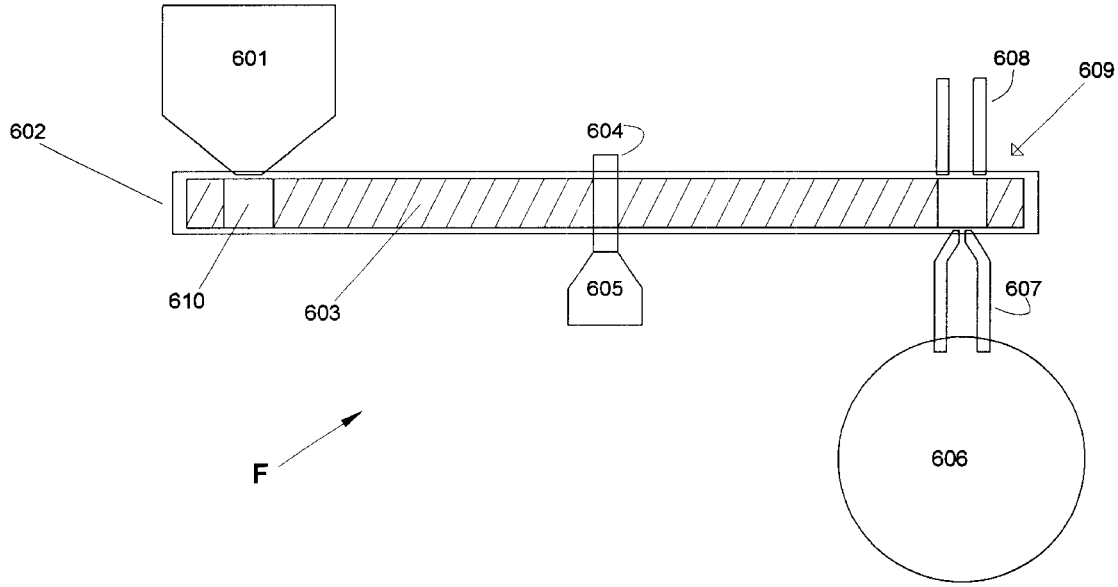
FIG. 6 is a cross-sectional schematic illustration of an implementation for a feeder system.

Reference was earlier made to the benefits of combining propellant gas and feed powder into a substantially continuous and uniform flow of a gas/feed powder mixture. In FIG. 6 a cross-section of one implementation of a feeder system F which accomplishes this task is illustrated. The feeder system F comprises a feed powder hopper 601, a rotary feeder wheel 603, which rotates within shell 602 about axle 604 as driven by motor drive 605. Hopper 601 mounts to an aperture in shell 602 so that the feed powder therein is supported by the upper surface of rotary feeder wheel 603.

Rotary feeder wheel 603 is supplied with a plurality of flow passageways 610 distributed substantially uniformly about a circular perimeter. These flow passageways pierce the feeder wheel, and have substantially uniform shape and volume. Also located along the same circular perimeter is turbulent flow cavity 609, comprising a propellant gas nozzle 607 piercing the lower surface of shell 602, an aligned flow passageway, and, immediately above the flow passageway, outlet 608 which pierces the upper surface of shell 602. Nozzle 607 is functionally connected to propellant gas reservoir 606.

When looking through shell 602 at the location of hopper 601, the flow passageways 610 can be seen. When looking through shell 602 at the location of outlet 608, nozzle 607 can be seen through one of the flow passageways, if the rotary feeder wheel is properly oriented. The result is, as wheel 603 is turned by motor drive 605, feed powder falls from hopper 601 into feed passageways 610 below. If wheel 603 turns slowly, the feed passageway will fill, whereas if it turns sufficiently quickly, it will only have time to partially fill. (This is influenced by the possible presence of a flow constriction (not shown) between hopper 601 and shell 602.)

Turbulent flow cavity 609 is formed when a filled flow passageway 610 passes by the radial position of nozzle 607 and outlet 608. At such time, the sudden release of gas from nozzle 607 blows the feed powder out of the flow passageway 610 and into outlet 608, thereby forming the desired gas/feed powder mixture. The mixture tends to be more uniform if the flow patterns in and near the flow passageways is turbulent. This can be encouraged by proper design of the nozzle and outlet. Contributing structures can include use of a slotted nozzle, and introducing small offsets in position between the nozzle and output. Flow passageways more complex than a simple cylindrical hole can also contribute to creation of turbulent gas flow and good mixture formation. This implementation provides a pulsed flow of gas/feed powder mixture having a constant average flow rate at the output, that flow rate being controlled by the rate of rotation of the rotary feeder wheel. For sufficiently rapid rotation rates, the pulsed flow is converted into a substantially continuous and uniform flow by interaction with the conduits, tubes, and manifolds through which the mixture is passed before reaching the growth nozzles (not shown).

The recycling mixer 514 of FIG. 5 can have a structure similar to that of the feeder means of FIG. 6. The main difference in the two applications is that the recycling mixer must accept feed powder pouring freely from a collector at the pressure of the processing atmosphere, and then form a mixture of the collected feed powder with a recycling gas at a considerably larger pressure. Effective sealing must thus be provided between the inlet and output of such a recycling mixer.

Figure 7A:
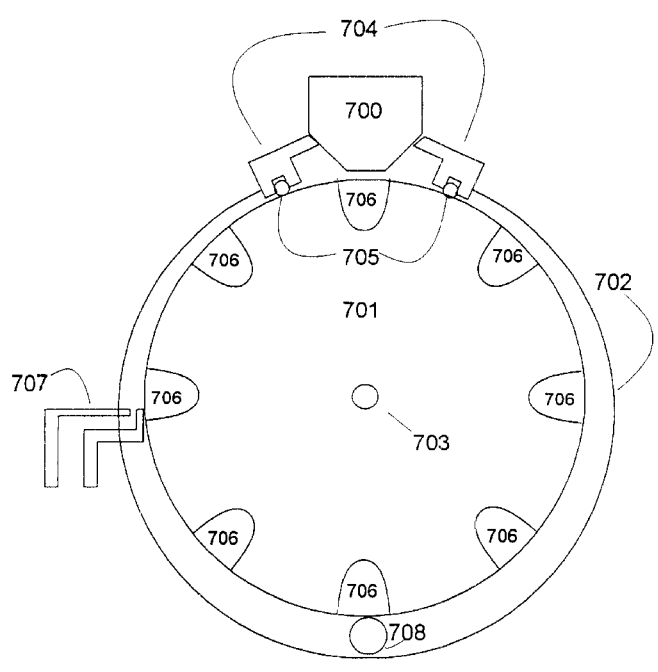
FIGS. 7a and 7b are orthogonal cross-sectional views of the recycling mixer.
Figure 7B:
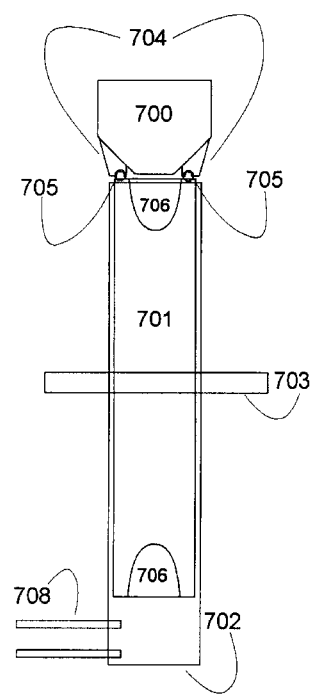

One embodiment of a recycling mixer is depicted in FIGS. 7a and 7b. Here a shell 702 encloses an offset rotary wheel 701, mounted on axle 703 to rotate within shell 702. Rotating wheel 701 has a plurality of radial reservoirs 706 positioned substantially uniformly about its outer edge. Gas inlet nozzle 707 and mixture output 708 pierce shell 702 usually below axle 703.

At the top of shell 702 is a gap, filled by hopper seal 704 and feed powder hopper 700. Hopper seal 704 is sealed to the outer edge of the rotary wheel 701 by o-ring 705 or equivalent means. The points at which o-ring 705 provides a seal against rotary wheel 701 must be arranged to be wide enough to allow a radial reservoir 706 to be sealed beneath hopper 700. In this configuration, high pressure gas introduced from a source (not shown) at the gas inlet nozzle 707 cannot escape from shell 702 around sealing means 704, or through hopper 700, but must leave through mixture outlet 708.

In operation, rotary wheel 701 turns, bringing the radial reservoirs 706 sequentially into place under hopper 700. On passing underneath the hopper, they fill with feed powder. They then pass under o-ring 705, and enter the mixing side of the recycling mixer. Here the radial reservoirs 706 are emptied of their contents, by a combined effort of gravity and the turbulent gas flow induced by gas inlet nozzle 707. The interactions of the feed powder and the gas flow within shell 702 form the desired recycling gas/powder mixture, which then exhausts through mixture output 708.

Figure 8:
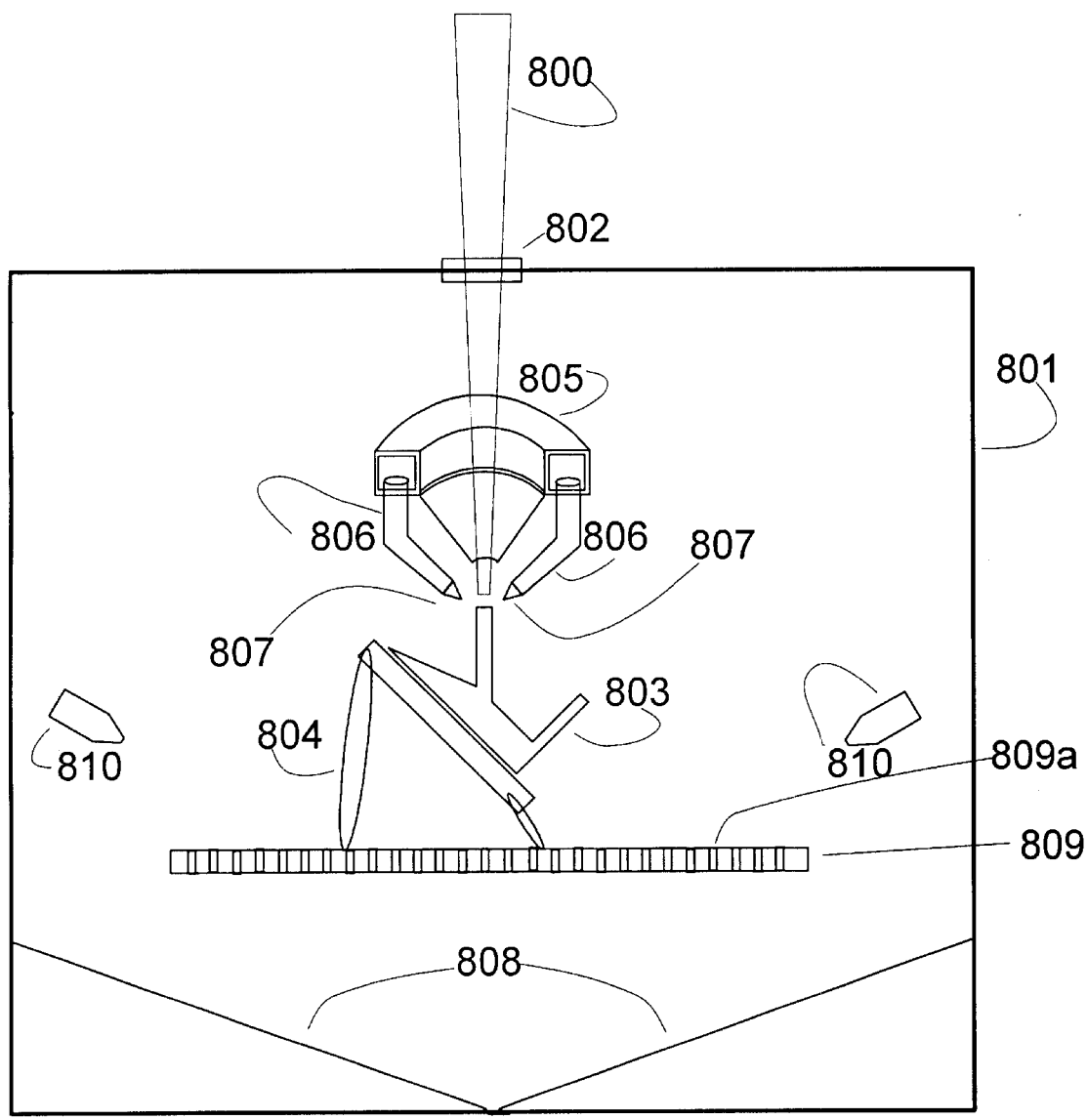
FIG. 8 is a schematic illustration of the operating chamber, featuring a powder collection system to collect and reuse feed powder not incorporated into the workpiece.

Subsystems for the recirculation and reuse of feed powder have been described, but the collection of feed powder which is not incorporated into the workpiece has only briefly described. Some of the mechanisms for such collection encompassed within the scope of the present invention are shown in FIG. 8. Energy beam 800 enters an operating chamber 801 through access 802. The energy beam 800 is directed onto the surface of workpiece 803, forming thereon a melt-pool (not shown) wherein the feed powder is to be injected for fabrication of the workpiece. Workpiece 803 is mounted on translation system 804, which is a part of the rastering system, which provides the relative motions between the melt-pool and the workpiece required to grow the desired structure. The powder delivery system comprises powder delivery manifold 805, transfer tubes 806, nozzles 807, and a source of gas/feed powder mixture (not shown).

The rest of the components illustrated in FIG. 8 help in collecting feed powder which is not incorporated into workpiece 803, and which is not immobilized on a surface within operating chamber 801 as build-up. Such waste feed powder is nominally free to move under an external influence. As gravity is such an influence, hopper 808 is placed below the growth surface and the working apparatus to collect feed powder which falls therefrom. The material composition, surface finish, and side angle of 808 are chosen so that the range of feed powders to be used will, on falling into the hopper, continue to move down the slope until they accumulate near the center of the hopper. At that point they can be collected for separation, or directly reused, if that is appropriate.

A certain portion of the waste feed powder will fall onto hopper 808 directly, whereas another portion will accumulate on the system machinery and surfaces of the workpiece. Powder which falls onto perforated baseplate 809 will tend to fall through the holes 809a therein. This tendency can be enhanced by adding means (not shown) to vibrate 809, causing the waste feed powder to dance about until it falls through the holes into hopper 808. Note that if baseplate 809 is to vibrate, either translation system 804 should not be mechanically attached to the baseplate, or the baseplate should only vibrate when the growth process is interrupted. Finally, sweep gas nozzles 810 can be placed within the operating chamber 801, appropriately positioned to blow waste feed powder away from sites of particular sensitivity or from sites where such powder tends to accumulate. The sweep gas nozzles 810 are functionally connected to a source of sweep gas (not shown). The gas emerging from the sweep gas nozzles acts to push the waste feed powder from surfaces, whereupon it eventually enters the hopper. Almost any gas can be used as a sweep gas, but it is particularly convenient to choose a sweep gas which is at least compatible, if not identical, with the propellant gas, the processing atmosphere, and (if used) the recycling gas.

The mode of incorporation of feed powder into the liquid of the melt-pool was briefly described earlier. There are at least four distinct incorporation modes, as illustrated in FIGS. 9–12. These are, briefly, incorporation of solid feed powder particles, incorporation of melted feed powder particles, decomposition and partial incorporation of feed powder particles, and partial incorporation of feed powder particles with solid residue. The same delivery system can be used to implement all the above modes, as well as hybrid and combined incorporation modes.

Which mode dominates the growth process depends strongly on the chemical composition of the feed powder and the growth surface, the power of the energy beam, the path of the feed powder in the energy beam above the growth surface, and the speed the melt-pool is moved over the growth surface, among many lesser process parameters. However, given appropriate thermodynamic phase information about the materials, the dominant mode can be predicted accurately using conventional thermal flow analysis modeling techniques as are known in the art.

Figures 9A, 9B, 9C:
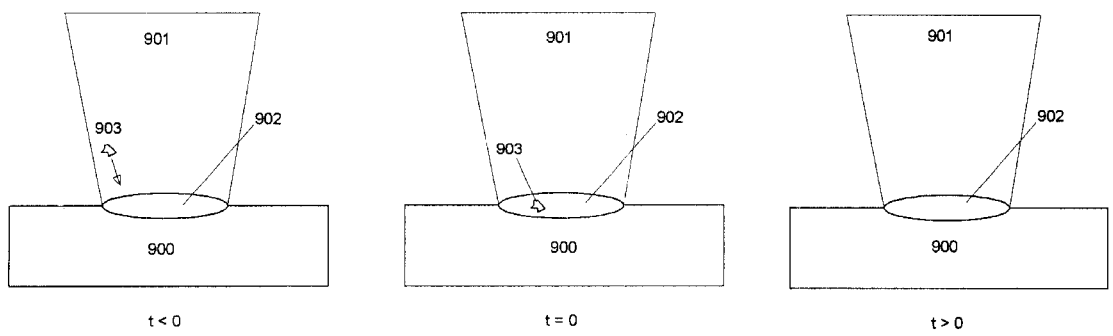
FIG. 9 is a schematic illustration of the time history for injection of unmelted feed powder into a melt-pool.

FIGS. 9*a–c* show a series of diagrams representing a time sequence of events occurring as a solid feed powder particle is incorporated into the melt-pool. The moment of incorporation is taken as t=0. FIG. 9*a* shows the situation prior to incorporation. Here an energy beam 901 is interacting with a growth surface 900, forming thereon a melt-pool 902 comprising melted growth surface. Feed powder particle 903 is approaching the melt-pool surface, is within the energy beam, but the particle has not absorbed sufficient energy to melt. FIG. 9*b* shows the situation at the moment of incorporation. Particle 903 has survived in solid form, and is now beneath (or at) the surface of the melt-pool 902. By FIG. 9*c*, particle 903 has become a part of the liquid in the melt-pool 902.

This can happen in at least two ways. First, when the particle 903 melts under the conditions found in melt-pool 902, and the liquid originally in the melt-pool 902 and the particle liquid are miscible. (If they are not miscible, poor material layer formation can occur. Such immiscibility, if combined with the rapid cooling which can be experienced by a melt-pool once the energy beam has left the region, also offers the opportunity to fabricate materials having strongly nonuniform microstructures.)

Second, particle 903 dissolves in the original melt-pool liquid, thereby becoming incorporated in the liquid of the melt-pool 902 without passing through a separate liquid state. This can occur when the melting point of the feed powder 903 is greater than the temperature of the melt-pool 902. Dissolution also allows use of the instant invention in processes where the growth surface 900 and the feed powder 903 do not have an overlapping liquidus regime.

Figures 10A, 10B, 10C:
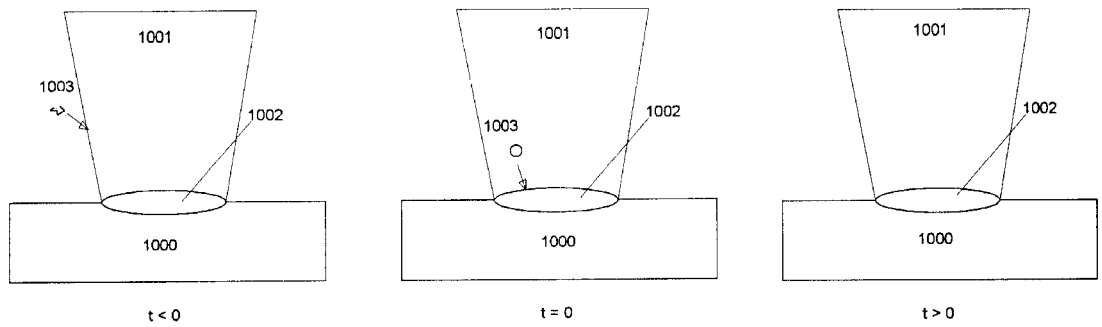
FIG. 10 is a schematic illustration of the time history for injection of melted feed powder into a melt-pool.

FIGS. 10*a–c* show a time sequence of the incorporation of a melted feed particle. FIG. 10*a* shows the situation before the feed powder particle 1003 enters the path of energy beam 1001. Energy beam 1001 is directed onto growth surface 1000, whereon it has formed a melt-pool 1002. FIG. 10*b* shows the situation after particle 1003 has entered the energy beam 1001, and has absorbed sufficient energy therefrom to melt while it is still above the growth surface. At a later time (FIG. 10*c*), the molten feed powder particle 1003 has entered melt-pool 1002, and either mixes freely therein or is only partially incorporated owing to miscibility limits or other thermophysical constraints. Note that this differs from laser spray technology in that the growth surface is also molten (at least within the melt-pool).

Figures 11A, 11B, 11C:
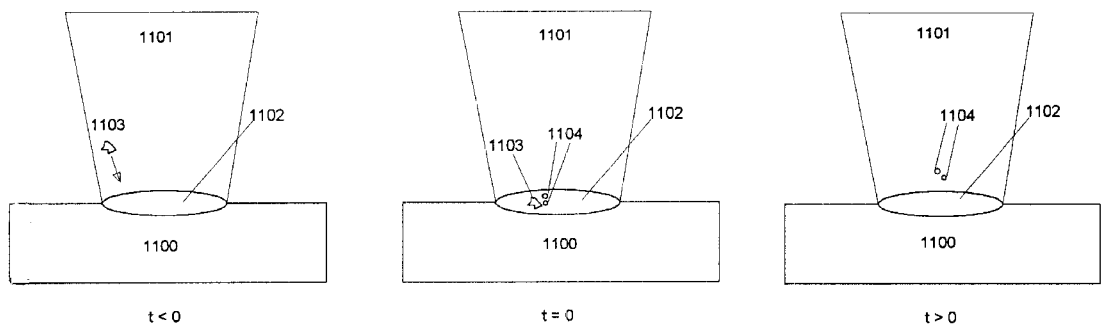
FIG. 11 is a schematic illustration of the time history for injection of feed powder into a melt-pool, followed by decomposition of the feed powder and escape of part of the decomposition products.

FIGS. 11*a–c* show a time sequence of the decomposition and partial incorporation of a feed powder particle 1103. FIG. 11*a* shows the initial situation. Energy beam 1101 intersects growth surface 1100, forming thereon a melt-pool 1102. Particle 1103 is within the energy beam 1101, is approaching the surface of the melt-pool, but is substantially unaffected (beyond simple heating) by the energy beam. In FIG. 11b, particle 1103 has entered melt-pool 1102. (Although shown as a solid particle within the melt-pool, it can be liquid for the purposes of this discussion.) Also shown here are bubbles 1104, representing a decomposition product of the feed powder particle. Such products can be generated in response to physical or chemical interactions between the particle and the melt-pool. The decomposition product 1104 can escape the melt-pool 1102, thus not becoming incorporated into the liquid of the melt-pool 1102. Alternately, if the decomposition product 1104 is a gas, under certain process conditions some portion of that gas expands within the melt-pool 1102, but remain therein until the energy beam has moved on and melt-pool 1002 resolidifies. In this situation, a porous material.

An example of this sort of incorporation would involve the injection of, e.g., a calcium carbonate feed powder particle into a melt-pool formed on a glass growth surface. When the particle enters the melt-pool, the surrounding heat causes the calcium carbonate to decompose into carbon dioxide, a gas which escapes from the melt-pool, and calcium oxide, which combines with the glass to form a surface layer of a modified glass.

Figures 12A, 12B, 12C:
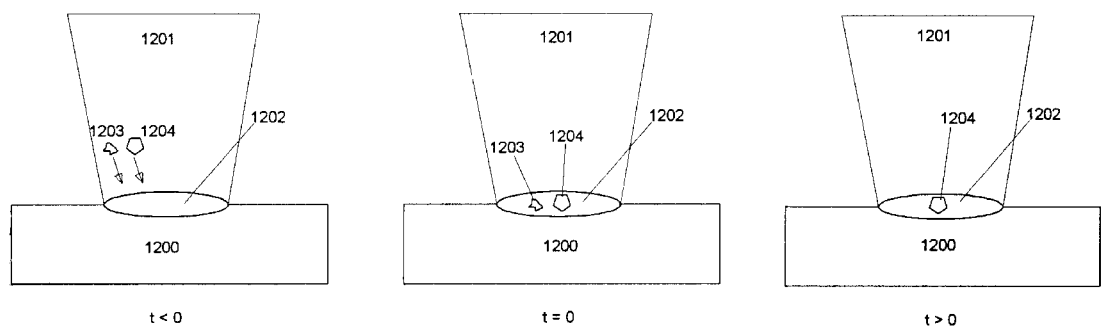
FIG. 12 is a schematic illustration of the time history for injection of feed powder comprising at least two components into a melt-pool when one of said components does not melt or dissolve in the melt-pool.

Another incorporation mode is illustrated in FIGS. 12a–c. FIG. 12a shows energy beam 1201 intersecting growth surface 1200, forming thereon melt-pool 1202. The feed powder being used for the fabrication process has two components, first particles 1203 and second particles 1204. Representative particles of each type are shown within the energy beam 1201. (For the present discussion, it does not matter when the particles melt or dissolve.)

In FIG. 12b first particle 1203 and second particle 1204 have been injected into the melt-pool 1202. By the time of FIG. 12c (intended to be just before the energy beam ceases to excite this region), it is clear that first particles 1203 have become incorporated into the melt-pool, but that second particles 1204 remain solid intrusions into the melt-pool. Exactly where the second particles wind up in the structure depends on many physical and process parameters. However, this is one approach toward making composite materials.

In describing these incorporation modes in detail it is not intended to limit the instant invention to using only those modes. Many other modes, combinations of modes, and hybrid modes will be clear to one skilled in the art, and all such modes are intended to be included in the scope of the instant invention. In particular, the foregoing discussion has referred to particles being injected into the melt-pool, or melting or dissolving in the liquid of the melt-pool. It is intended that this phraseology be extended to include situations where the particle is located at the surface or the edge of the melt-pool, rather than being strictly limited to the interior thereof.

To this point primarily energy beam driven fabrication systems having only a single source of feed powder have been described. That feed powder can be a mixture of various components, but is handled by a single system. The instant invention can also be used with multiple source powders, which are combined within the system and with a propellant gas to form the desired gas/feed powder mixture. Once this mixture is formed, the remainder of a fabrication system after the instant invention is nearly identical to that of a system intended to use only a single feed powder. (One change is that the process of reusing waste feed powder is more difficult, as the composition of the feed powder, made from multiple source powders, can change during operation.)

Probably the most important reason to use a fabrication system designed for multiple source powders is the possibility of dynamically changing the composition of the feed powder during the fabrication process. By doing this, one can produce an object comprising graded material, said grading manifesting along any desired direction in 3-space. Multiple source powders can also be used to fabricate composite materials, nonequilibrium materials, and metastable materials in the manner described earlier. The source powders can be chosen from the same materials as discussed for the feed powder.

In most cases, an implementation of the instant invention designed to use a single feed powder and the analogous implementation designed to use multiple source powders differ significantly only in the delivery means. (A notable exception is that the problem of reusing collected waste feed powder becomes more difficult—the individual source powders generally must be separated prior to reuse.) Accordingly, several classes of implementations of delivery means comprising multiple source powders will be described.

Figure 13:
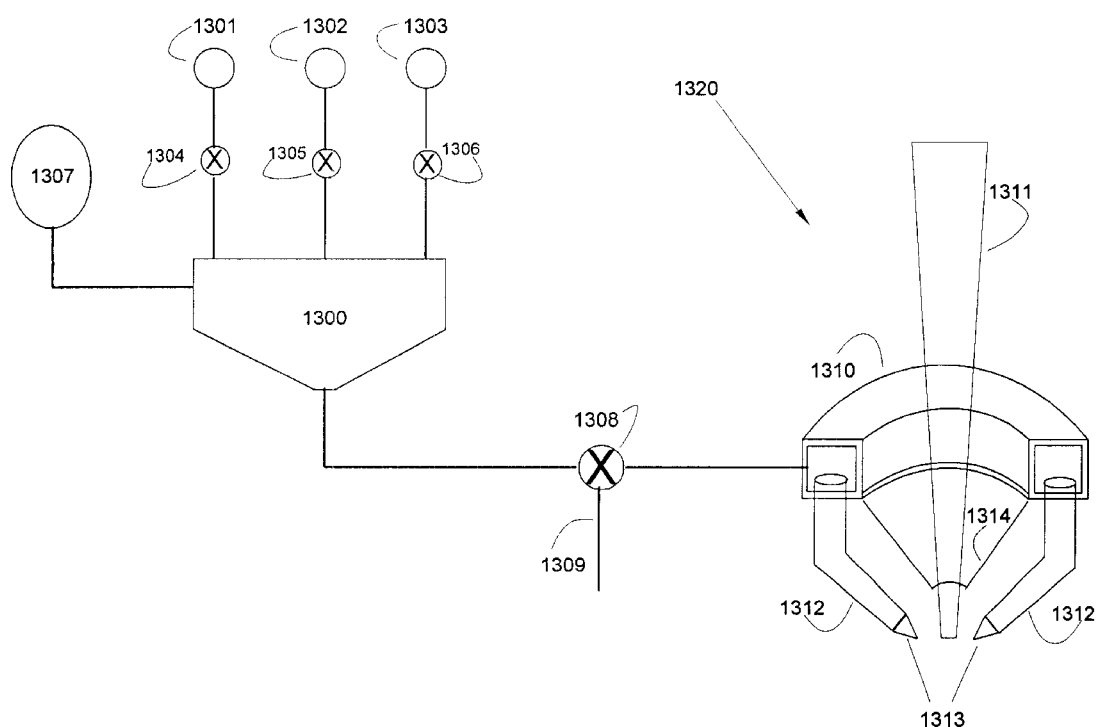
FIG. 13 is a schematic illustration of an energy beam driven rapid fabrication system designed to use multiple source powders.

In FIG. 13 is shown a multiple powder delivery system, comprising a plurality (here numbering three) of source powder reservoirs 1301, 1302, and 1303. These are functionally connected, via feeder systems 1304, 1305, and 1306, respectively, to powder blending system 1300. Feeder systems 1304, 1305, and 1306 act to provide a substantially uniform, continuous, and controllable flow of their associated source powder to the powder blending system 1300. The rate of powder flow can be controlled by the feeder system for each source powder separately, allowing the average composition of the composite feed powder (which is substantially composed of the combined flows of the various source powders) to vary as the object is being fabricated. This allows direct formation of graded as well as abruptly changing materials within a single object.

Powder blending system 1300 is also functionally connected to propellant gas source 1307, which is regulated to provide a substantially constant, uniform, and controllable flow of propellant gas. Strictly speaking, this flow need not be either constant or uniform, but simpler system operation results if it is. Powder blending system 1300 then acts to mix the flows of source powder from feeder systems 1304, 1305, and 1306 and the flow of propellant gas from source 1307 to form a gas/feed powder mixture. (The feed powder now substantially consists of the combined source powder flows.) This can be accomplished by introducing the source powders and the propellant gas into a mixing cavity (not shown), preferably introducing turbulent flow, within powder blending system 1300.

The gas/feed powder mixture is then fed to a powder blend delivery manifold 1310 after passing through cutoff valve 1308, whose function is to abruptly cut off flow of the mixture to the manifold 1310 if required. Cutoff valve 1308 can be a simple pinch valve, thereby halting the mixture flow, or alternately can act to divert the mixture flow into conduit 1309. This latter has some advantages which appear when valve 1308 is reopened and the flow resumes, possibly with a changed flow rate and feed powder composition. Manifold 1310 and its associated transfer tubes 1312, nozzles 1313, extended energy beam shield 1314, and energy beam 1311 form a nozzle assembly 1320 similar to that described earlier.

Figure 14:
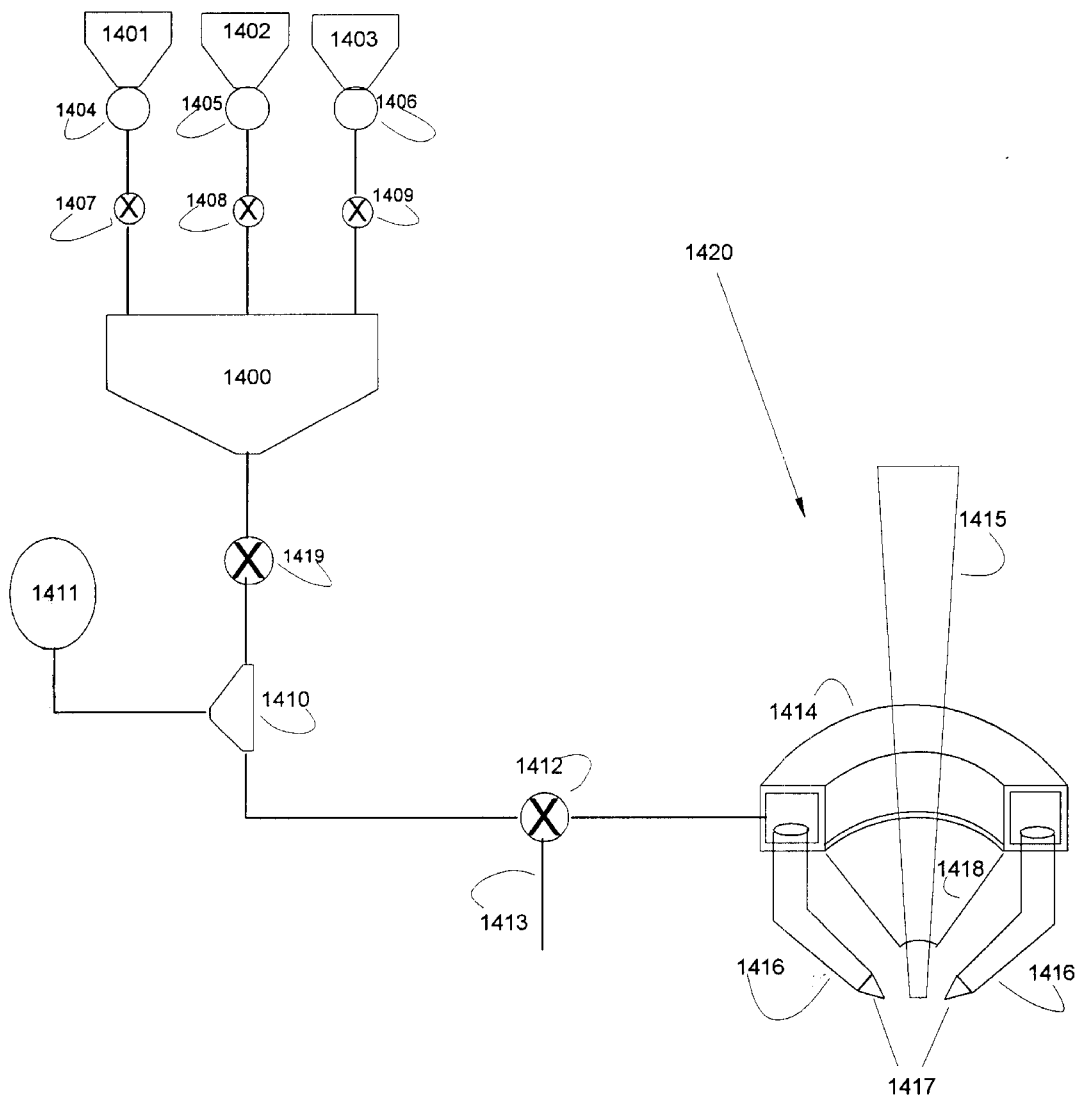
FIG. 14 is a schematic illustration of another energy beam driven rapid fabrication system designed to use multiple source powders.

Alternately, the multiple powder delivery means shown in FIG. 14 can be used. The general operation of this system is closely related to that of FIG. 13. However, whereas in FIG.

13 the functions of combining the source powders into a combined feed powder and producing a gas/feed powder mixture by combining with that feed powder were carried out in one system component, in FIG. 14 these functions are carried out separately. Source powder hoppers 1401, 1402, and 1403 supply feeder systems 1401, 1405, and 1406, respectively, with their respective source powders. The feeder systems supply a substantially continuous and uniform flow of their respective source powder to powder mixer 1400.

Powder mixer 1400 acts to combine the individual flows of source powders into a combined feed powder substantially consisting of a uniform mixture of source powders in the amounts delivered by the feeder systems. This combined feed powder is then supplied to gas mixing system 1410, which is functionally connected to propellant gas source 1411, which supplies a substantially continuous and uniform flow of propellant gas. Gas mixing system 1410 uses methods outlined earlier, preferably including a turbulent mixing cavity (not shown), to deliver a substantially continuous and uniform flow of gas/flow powder mixture, through cutoff valve 1412, which functions as before, to nozzle assembly 1420, comprising components 1414–1418.

Figure 15:
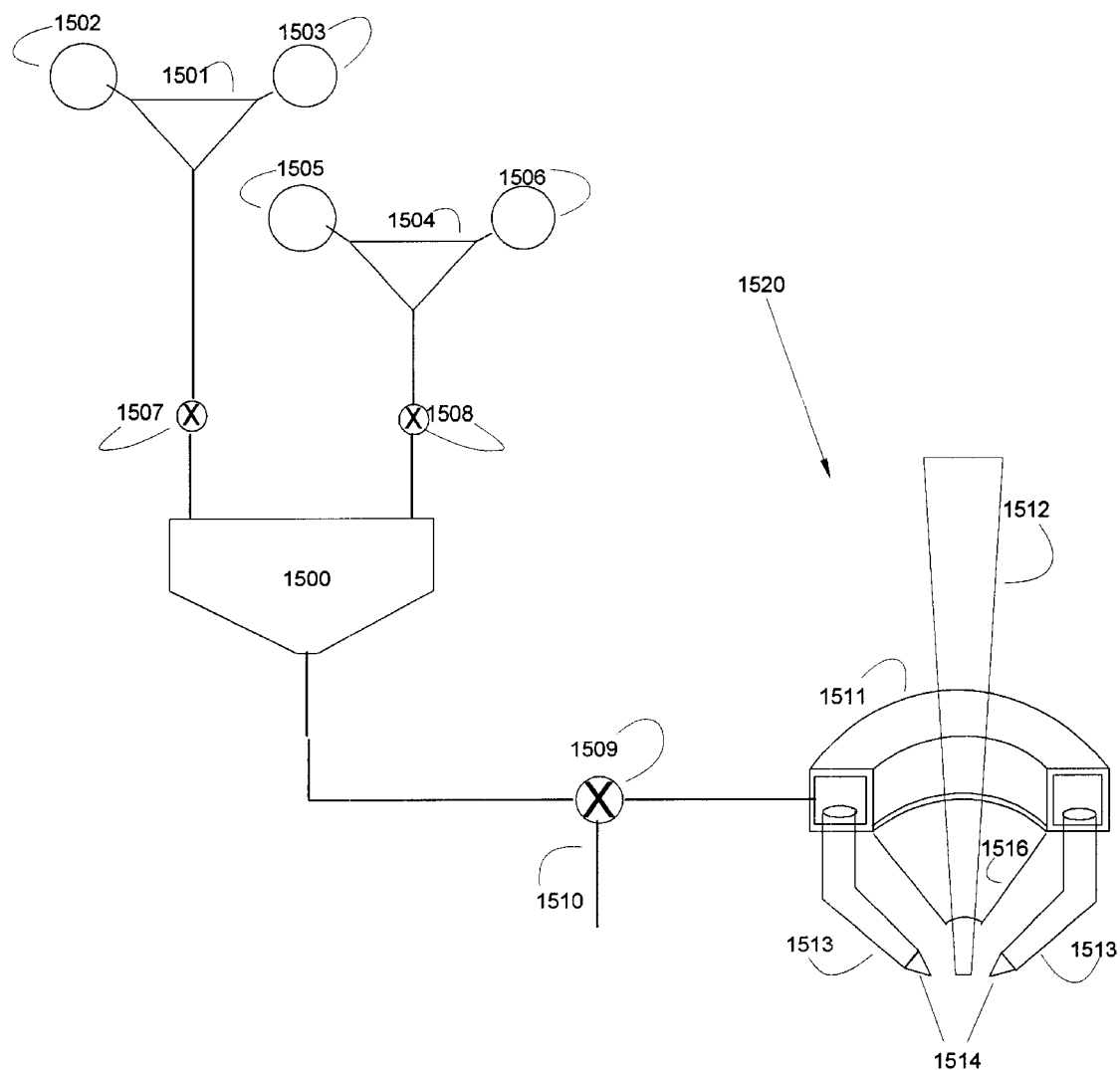
FIG. 15 is a schematic illustration of a third energy beam driven rapid fabrication system designed to use multiple source powders.

Yet a third approach to the problem of handling multiple powders appears in FIG. 15. In this approach, each individual source powder is mixed with a propellant gas, and then the gas/source powder mixtures are themselves mixed to form the desired gas/feed powder mixture. For simplicity all propellant gases shall be assumed to be the same. Here propellant gas source 1502 supplies propellant gas, and source powder reservoir 1503 supplies source powder, to feeder system 1501, which itself supplies a substantially continuous and uniform flow of gas/source powder mixture. Apparatus elements 1504–1506 serve the same function as do 1501–1503, except that each supplies a different source powder. Any number of such source powder assemblies can be used in practicing the instant invention.

The source powder assemblies feed their gas/source powder mixtures into mixture blender 1500, wherein the various gas/source powder mixtures are combined to form a combined gas/feed powder mixture. This gas/feed powder mixture is then delivered, through cutoff valve 1509, which functions as before, to nozzle assembly 1520, comprising components 1511–1516.

The present invention is herein described with reference to specific implementations to allow general principles to be discussed in a concrete manner. Reference to such implementations is not intended to reduce or otherwise limit the scope of the present invention. That scope is intended to be defined by the claims appended interpreted in the light of the specification and all figures comprised therein.

What is claimed is:

1. A system for fabricating an object, comprising:
    a) a growth surface;
    b) an energy beam directed onto the growth surface, forming thereon a melt-pool comprising a liquid;
    c) a delivery system which directs a converging flow of feed powder onto the melt-pool;
    d) means for translating the delivery system relative to the growth surface while controlling the rate of flow of feed powder, thereby depositing at least one material layer so as to form the object;
    e) an operating chamber containing at least the delivery system, the growth surface, the means for translating, and a processing atmosphere; and,
    f) a waste powder collector system, wherein the waste powder collector system includes a collector and a perforated base plate disposed to allow waste feed powder to enter the collector.

2. The system of claim 1, wherein the processing atmosphere is chosen from the group consisting of nitrogen-containing gases, carbon-containing gases, inert gases, oxidizing gases, reducing gases, and mixtures thereof.

3. The system of claim 1, wherein the plurality of nozzles are disposed and oriented so that the converging flow of feed powder injects feed powder into the melt-pool along trajectories substantially normal to the surface of the melt-pool.

4. The system of claim 1, further comprising a recirculation system which recirculates and reuses the processing atmosphere.

5. The system of claim 1, wherein the delivery system comprises:
    a) a feeder which supplies a substantially continuous and uniform discharge of a gas/feed powder mixture, the mixture comprising a propellant gas and feed powder;
    b) a plurality of nozzles adapted to produce a converging flow of feed powder; and,
    c) a powder delivery manifold which transfers the gas/feed powder mixture to the plurality of nozzles.

6. The system of claim 1, wherein the waste powder collection system further comprises a vibrator which vibrates the perforated baseplate.

7. The system of claim 1, wherein the waste powder collection system further comprises a sweep gas system comprising sweep gas jets which sweep waste feed powder into the collector.

8. The system of claim 1, wherein the waste powder collection system further comprises:
    a) a recycling mixer converting waste feed powder and a recycling gas into a recycling gas/powder mixture; and
    b) a separating system which separates feed powder from the recycling gas/powder mixture.

9. The system of claims 8, wherein the recycling mixer comprises:
    a) a rotating wheel having a plurality of radial reservoirs around its perimeter;
    b) a powder intake positioned so that feed powder not incorporated into the melt-pool which enters the powder intake is directed into a radial reservoir;
    c) a gas/powder mixing system which converts the feed powder from the radial reservoirs and the recycling gas into a recycling gas/powder mixture;
    d) a powder output directing the recycling gas/powder mixture to the means to separate and reuse; and
    e) sealing means to allow the powder intake and the powder output to maintain a relative pressure differential.

10. The system of claim 8, wherein the separating system further comprises a sieve disposed to prevent improperly sized particles of waste feed powder from being reused.

* * * * *